United States Patent Office 3,460,117
Patented Aug. 5, 1969

3,460,117
ERROR DETECTING METHODS
Marius Cohn and Abraham Franck, Minneapolis, Minn., assignors to Sperry Rand Corporation, New York, N.Y., a corporation of Delaware
Continuation-in-part of application Ser. No. 120,048, June 27, 1961. This application Sept. 16, 1965, Ser. No. 492,976
Int. Cl. G08b 29/00; G06f 11/00
U.S. Cl. 340—146.1                                   3 Claims

ABSTRACT OF THE DISCLOSURE

A method is described for checking the accuracy of transmission of digital information wherein at the transmitting station a check number is generated by developing a check character which is a function of the permutation of the message bits which are weighted and then summed in a modular two adder. Appended to this check character to form the check number is one or more parity bits such that the total number of digits of a given binary significance in the check number odd.

---

This is a continuation-in-part of application Ser. No. 120,048 filed June 27, 1961, and now abandoned.

This invention relates generally to a method for determining the accuracy of transmission of information, and more specifically to a method for detecting errors in the transmission of binary coded data between two separated points such as a long lines communication network.

In a pulse coded communication system, an information character or a word may be conveyed between two points by means of a serial train of signals or pulses. Since the invention will be described and illustrated in the system employing direct binary signals for the representation of digital information as distinguished from other types of binary signals, such as for example, binary coded decimal, a signal representing a digit will be referred to as a "bit," a group of bits will be referred to as a "word" or unit of intelligence, and a group of words will be referred to as a message. Due to interference or some other extraneous factor, there is a possibility that one or more digital signals may be lost during transmission. The present invention involves a method for developing a check word or check number which is dependent upon the characteristics of the message to be transmitted, appending this check word or check number to the data word or message, transmitting this composite message to a receiving station, and recomputing from the data portion of the message, in the same manner, a check number. By comparing the check number sent along with the message with the check number developed at the receiving station, it becomes possible to determine whether or not errors have occurred during the transmission of the message and in some cases to correct such errors.

In the digital data processing art it is well known that authentication of the validity of the transfer of information from one location to another can be achieved by associating with each data word the check number which bears a predetermined relation to the information word being transferred. The information is in error and this error is detected if the check word derived from the data word at the receiving station is different from the transmitted check word developed at the transmitting station. In the prior art there is described methods of error checking wherein the check word to be sent along with the digital data is computed from the data by assessing weights to each digit position in the data word. A new number is then found which is the sum of the weights of all columns of the original word in which the digit "one" occurs. Also, in the prior art there are described error checking methods wherein one or more parity bits are assigned to the data to be transmitted such that the number of digits in the combination of a predetermined type is odd (or even).

A method of the present invention is related to some of the schemes described in the prior art, but differs therefrom in the method employed to weight the bits in the data word. The method of the present invention contemplates a sequential weighting arrangement for binary coded data rather than some other arbitrary scheme. By doing so, the amount of equipment required for insuring the correct transmission of information is considerably reduced from that required by known prior art methods.

As will be described and pointed out more clearly below, when the check number is computed according to the teachings of the method of the present invention, it is possible to detect to a very high degree of success the occurrence of up to two errors in a message. More specifically, except for in a single case of where an error occurs in both the information and in the computed check character itself, the error checking method of this invention is able to guarantee absolutely the detection of two errors in a transmitted message.

In addition to the check character computed by a sequential weighting arrangement of the bits in the message, the check number of the present invention may also employ a parity bit or bits. For example, a first check character may be computed by the sequential weighting method to be described, and then a parity bit is derived and appended to the check characters such that the total number of "one" bits in the combination of the message and check character is odd. By merely appending a single parity bit to the message and check character, in all cases of the occurrence of two errors they will be detected, and in the case where three errors occur during the transmission, it becomes highly probable that these errors will also be detected. Furthermore, by employing a second parity bit the absolute detection of up to three errors can be guaranteed.

It is accordingly the primary object of the present invention to provide a novel method for developing a unique check signal group for a second group of binary signals which form a data word to be transmitted.

Another object of this invention is to provide a method for generating a check number for a binary coded data word which is highly reliable, yet still inexpensive to implement.

Still another object of this invention is to provide an improved and simplified method for generating a check word from the binary coded data which when transmitted along with the data, can be compared at the receiving station to a check word recomputed from the data word so as to indicate whether or not an error has occurred in the transmission.

Still another further object of the present invention is to provide a method whereby both parity checking and "check character" checking are combined in a novel manner so as to increase the detecting characteristics over that which has heretofor been accomplished by prior art methods and apparatus.

Yet still another object of this invention is to provide a method for determining the accuracy of transmission of a message between two points by developing at the first point a check character and a parity bit and transmitting said data, said check character and said parity bit as a message in a predetermined format to the second point, and recomputing from said data word portion of said message at the second point a check character and parity digit for comparison to the check character and parity bit computed at the first point. As the terms are used herein, the check character refers to the character resulting from the summation of the sequentially weighted data bits in a modular accumulator. The term check number includes the combination of the aforementioned check character and the parity bit or bits.

Yet still a further object of the present invention is to provide a method for checking the accuracy of transmission of digital data wherein the check number transmitted along with the message can be easily separated therefrom at the receiving station so as to be compared to a check number recomputed from the message at the receiving station.

The foregoing and other features of the invention will become more apparent from the detailed description of the method as related to certain embodiments shown in the accompanying drawings which illustrates diagrammatically apparatus that may be used in carrying out the method of this invention in which.

Figure 1:
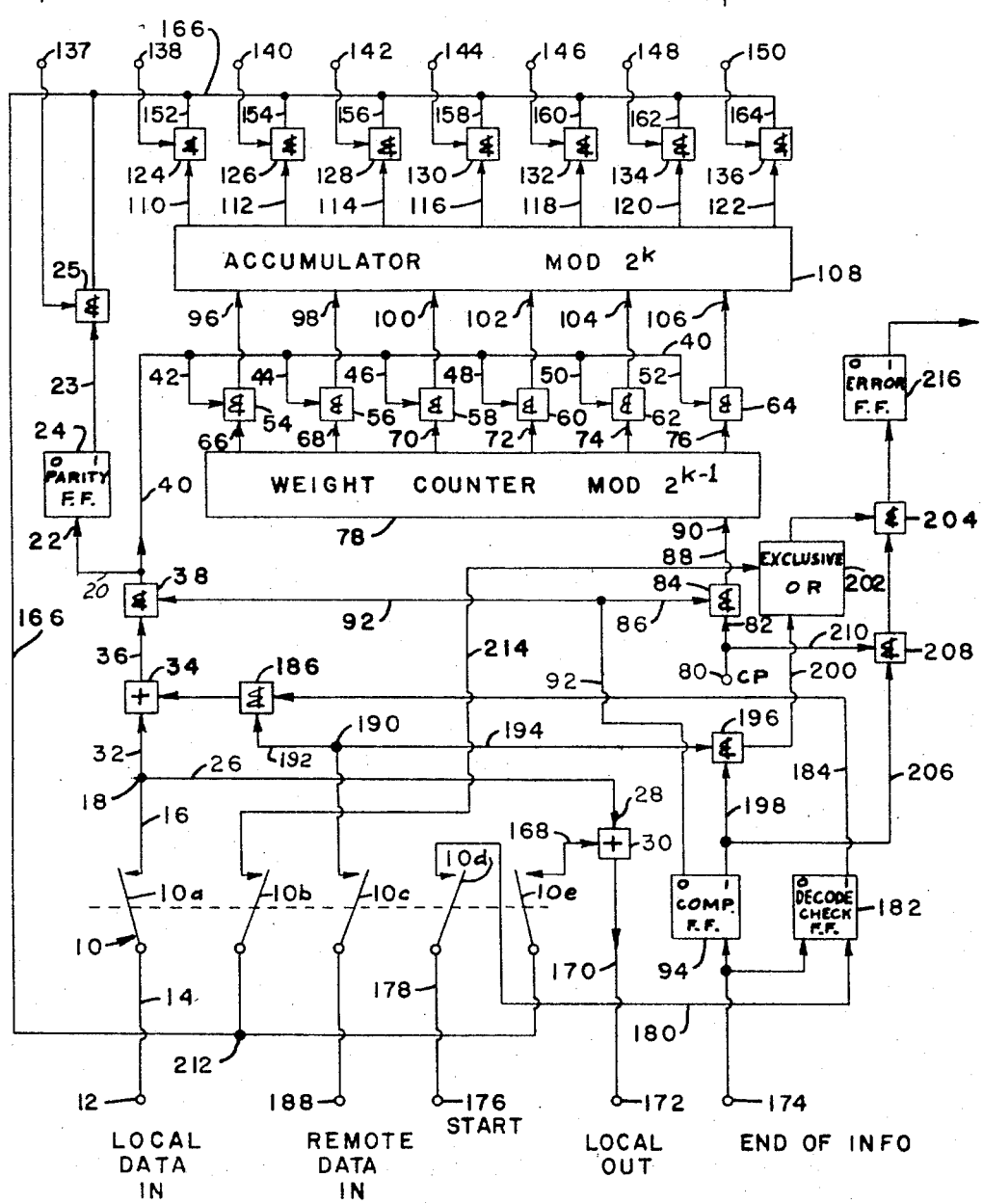
FIGURE 1 illustrates error detection circuitry of the present invention.

There are a number of approaches which may be taken in setting up an error checking scheme of this invention. These approaches relate to the manner in which the parity digit is used. For example, Table I below lists various possible formats for the transmitted message.

In the table, $p$ represents the parity digit, $c$ represents the check character, and $m$ represents the message or data word. As will be seen more clearly later on in this specification, the number of errors detected is dependent on the format employed to a certain extent.

TABLE I $p$ on $m$ only; $c$ on $m$ only
$p$ on $c$ and $m$; $c$ on $m$ only
$p$ on $m$ only; $c$ on $m$ and $p$
$p$ on $c$ only; $c$ on $m$ only The method employed to develop the check character at the first point or sending station comprises the steps of developing the weighted signal for each of the binary "one" digits in the data word, summing these weighted signals in a modular accumulator such that the effective sums of all the weighted signals are effectively divided by the accumulator modulus, and discarding all but the signals forming the remainder of the effective division. This remainder or residue is the desired check character. In forming the weighted signals, the bits forming the data word are multiplied by a sequential series of numbers, for example, the least significant digit in the message is multiplied by one, the next least significant digit is multiplied by two, etc. Because a sequential weighting scheme is employed, relatively simple hardware can be utilized to carry out this method of error detection.

The following mathematical derivation more clearly shows the steps employed and also gives an idea of the hardware requirements for a system employing this method of error detection. In the following derivation, the parity digit is first placed on the data word and then the check character is then placed on the resultant newly formed parity-checked message (Item 3, Table 1).

Let the format of a complete transmitted message be as follows:

$$c_k c_{k-1} \ldots c_2 c_1 p m_n m_{n-1} \ldots m_2 m_1 \quad (1)$$

where:

$$m = m_n m_{n-1} \ldots m_2 m_1 \quad (2)$$

is the original data word, $p$ is the parity bit so determined as to make the sum of the "one" bits in the combination of $m$ and of $p$ odd, and $$c = c_k c_{k-1} \ldots c_2 c_1 \quad (3)$$

is the check character. Since the check character is unique for all different combinations of digits in $m$, detection of any one or two errors in the previous $n+1$ bits, i.e., the message $m$ and parity bit $p$, is guaranteed.

To determine the check character, weights $w_n$ are assigned to each of the bins $m_n$ respectively, and a weight $w_{n+1}$ is assigned to the parity bit $p$. As mentioned above, simple successive weights are assigned, namely, $$w_j = j \quad (4)$$

where:

$$j = 1, 2, 3 \ldots n, n+1 \quad (5)$$

The next step in the method is to form the sum $$S = \sum_{j=1}^{n} j m_j + (n+1)p \quad (6)$$

$$= m_1 + 2m_2 + 3m_3 + \ldots n m_n + (n+1)p \quad (7)$$

in a modular accumulator where the modulus M is of the form $2^k$ (an integral number of powers of 2) where $k$ is the least integer which satisfied the following inequality:

$$n + (n+1) < 2^k = M \quad (8)$$

The relationship that should exist between the weights and the modulus can be described as follows: where M is the modulus and $w_i$ is the weight for the $i$th binary position of the message, if M does not divide either the difference $w_i - w_j$ or the sum $w_i + w_j$ for all possible values of $i$ and $j$, an integral number of times, then error detection is achieved for either one or two random errors in the message. Use of the parity bit extends the error detection capabilities to three bits.

By forming the weighted sum S in a modular adder, the result is an effective division of S by M with the remainder of residue being the check character.

As an aid in the understanding of the foregoing derivation, an example will now be presented. Assume that the binary coded data word that it is desired to transmit is 1 0 0 1 1 1 0 1 0 1 1 0 1 0 0 1 1 1 0 1

An examination of this word reveals that the number of "one" bits contained therein is even. In order to provide an odd parity check, a "one" bit must be placed in the most significant digit position, i.e., the leftmost digit position, so that the number of binary "one" digits appearing in the combination is odd. The parity checked word may therefore be written as follows:

| Parity | Data Bits |
|---|---|
| 1 | 1 0 0 1 1 1 0 1 0 1 1 0 1 0 0 1 1 1 0 1 |

As mentioned previously, to determine the proper check character which should be appended to the parity checked message before it is transmitted to a receiving station, sequential weights are assigned to the various digit positions in the parity checked message. For example, a weight of 1 is assigned to the least significant digit, i.e., the rightmost or first appearing digit, a weight of 2 is assigned to the next-least significant or next appearing digit, a weight of three is assigned to the third least significant digit, etc. The parity checked word along with the sequential weight for each digit in the word is shown below.

| Parity | Data Bits |
|---|---|
| 1 | 1 0 0 1 1 1 0 1 0 1 1 0 1 0 0 1 1 1 0 1 |
| 21 | 20 19 18 17 16 15 14 13 12 11 10 9 8 7 6 5 4 3 2 1 |

The next step in the method is to sum the weights associated with the "1" digits in the data word in a modular adder such that the weighted sum is effectively divided by the modulus. The remainder left after this effective division is the desired check character. The modulus for the adder required is of the form $2^k$ where $k$ is the least integer of such a value that $2^k$ is greater than the sum of the largest two weights necessary for the message. In the above example then $2^k$ must be greater than 41 (see Equation 8). This means $k$ must equal 6. The modulus, then, is 64. When the bit weights are added in an adder of modulus 64, the residue in the six bit adder upon the completion of the summing operation is decimal 16 or binary 0 1 0 0 0 0. This last mentioned binary number is the check character which may be appended to the parity checked message and transmitted to the receiving station. The complete message which it is desired to send is shown below.

| Check Number | Data Bits |
|---|---|
| 0 1 0 0 0 0 1 | 1 0 0 1 1 1 0 1 0 1 1 0 1 0 0 1 1 1 0 1 |

Now, assume that during the transmission of this message an error occurs in the 12th digit position from the right, i.e., the digit "0" in the 12th digit position somehow becomes a binary "1" digit. In recomputing the check number from the data word portion of the message in the same manner as was done at the sending station, the result will be:

0 1 1 1 0 0

When this check number generated at the receiving station is compared with that developed at the sending station, the fact that they are not equal indicates that an error has occurred during transmission. In fact, when only one error has occurred in the message during transmission, error correction can be achieved when means are provided for determining the numerical difference between the two check numbers, i.e., the transmitted and receiver generated check number. This difference indicates in which digit position of the message the error has occurred. For example, under our previous assumption the difference between the two check words in decimal notation is 28−16=12, 12 being the digit position in which we assumed the error has occurred.

The foregoing example relates to a method wherein the parity digit is first placed on the data word $m$ so as to make the number of binary "1" signals in the combination odd, and then a check character was developed on the resultant parity checked message. The following tables aid to illustrate the errors which are detected when this advantageous format is employed, and also indicate the results which are achieved when the format of the transmitted data is changed. In the following tables the word "correction" indicates that error correction can be achieved in the case of a single error. The word "probable" means that, although in these indicated situations there is no absolute or guarantee of error detection, the probability of undetectable combinations of errors occurring is quite small. The blanks (− −) in the tables mean that since the errors have been detected by other means, the additional check provided by the item in question is immaterial. The term "indifferent" as used herein indicates that it is immaterial how many errors occur in the item in question so long as the conditions set on the other items listed along with it are satisfied. For example, in Table II below, it makes no difference how many errors occur in the check character $c$ during transmission as long as the number of errors in the information $m$ is even and there is only one error in the parity bit. It is possible to increase the error detecting capabilities of the system over that set forth in the tables by employing an additional parity bit along with the already checked message. For example, if the format employed in Tables II and III are used in the system and only a single parity bit is used, although it is unlikely, there is no absolute guarantee that two errors in the information when coupled with one error in the check number will be detected. Also, there is no guarantee that a single error occurring simultaneously in the information, the parity bit and the check character will be detected. However, if an extra parity bit is placed on the resultant check number and message or if a second parity bit is placed on the check character $c$, it is possible to absolutely guarantee the detection of three errors, no matter in which position of the transmitted message they occur.

As another illustration, if the format indicated in Tables IV and V is employed and a second parity bit is placed on the message $m$ to make the number of "1" bits therein odd, the detection of three errors will be guaranteed. It is true also that if a second parity bit is placed on the check number, three errors can also be detected with absolute surety.

TABLE II.—GENERAL CASES

[Parity (p) on Information (m) Only; Check Character (c) on Information (m) Only]

| Number of Errors ||| Detection of Errors ||
|---|---|---|---|---|
| Location of Errors || Check Character (c) | Errors Detected by— ||
| Information (m) | Parity (p) | | Parity (p) | Check Number |
| 0 | Indifferent | Any | − − | Yes |
| 1 | Indifferent | 0 | − − | Yes |
| 2 | Indifferent | 0 | − − | Yes |
| Odd | 0 | Indifferent | Yes | − − |
| Even | 1 | Indifferent | Yes | − − |
| 0 | 1 | Indifferent | Yes | − − |

TABLE III.—SPECIAL CASES

[Parity (p) on Information (m) Only; Check Character (c) on Information (m) Only]

| Number of Errors ||| Detection of Errors ||
|---|---|---|---|---|
| Location of Errors || Check Character (c) | Errors Detected by— ||
| Information (m) | Parity (p) | | Parity (p) | Check Number |
| | (One Error Only) || | |
| 1 | 0 | 0 | Yes | Yes (Correction) |
| 0 | 1 | 0 | Yes | − − (Correction) |
| 0 | 0 | 1 | − − | Yes (Correction) |
| | (Two Errors Only) || | |
| 2 | 0 | 0 | No | Yes |
| 1 | 1 | 0 | No | Yes |
| 1 | 0 | 1 | Yes | Probable |
| 0 | 1 | 1 | Yes | Yes |
| 0 | 0 | 2 | − − | Yes |
| | (Three Errors Only) || | |
| 3 | 0 | 0 | Yes | Probable |
| 2 | 1 | 0 | Yes | Yes |
| 2 | 0 | 1 | No | Probable |
| 1 | 1 | 1 | No | Probable |
| 1 | 0 | 2 | Yes | Probable |
| 0 | 1 | 2 | Yes | Yes |
| 0 | 0 | 3 | − − | Yes |

TABLE IV.—GENERAL CASES

[Parity (p) on Check Character (c) and Information (m) Check Character (c) on Information (m) Only]

| Number of Errors ||| Detection of Errors ||
|---|---|---|---|---|
| Location of Errors || Check Character (c) | Errors Detected by— ||
| Information (m) | Parity (p) | | Parity (p) | Check Number |
| 0 | Indifferent | Any | − − | Yes |
| 1 | Indifferent | 0 | − − | Yes |
| 2 | Indifferent | 0 | − − | Yes |
| Even or No Errors | 0 | Odd Errors | Yes | − − |
| Odd Errors | 0 | Even or No Errors | Yes | − − |
| Even or No Errors | Error | Even or No Errors | Yes | − − |
| Odd Errors | Error | Odd Errors | Yes | − − |
| 0 | Error | 0 | Yes | − − |

TABLE V.—SPECIAL CASES

[Parity (p) on Check Character (c) and Information (m); Check Character (c) on Information (m) Only]

| Number of Errors | | | Detection of Errors | |
|---|---|---|---|---|
| Location of Errors | | Check Character (c) | Errors Detected by— | |
| Information (m) | Parity (p) | | Parity (p) | Check Number |
| (One Error Only) | | | | |
| 1 | 0 | 0 | Yes | Yes (Correction) |
| 0 | 1 | 0 | Yes | — — (Correction) |
| 0 | 0 | 1 | Yes | Yes (Correction) |
| (Two Errors Only) | | | | |
| 2 | 0 | 0 | No | Yes |
| 1 | 1 | 0 | No | Yes |
| 1 | 0 | 1 | No | Probable |
| 0 | 1 | 1 | No | Yes |
| 0 | 0 | 2 | No | Yes |
| (Three Errors Only) | | | | |
| 3 | 0 | 0 | Yes | Propable |
| 2 | 1 | 0 | Yes | Yes |
| 2 | 0 | 1 | Yes | Probable |
| 1 | 1 | 1 | Yes | Probable |
| 1 | 0 | 2 | Yes | Probable |
| 0 | 1 | 2 | Yes | Yes |
| 0 | 0 | 3 | Yes | Yes |

TABLE VI.—GENERAL CASES

[Parity (p) on Information (m) Only; Check Character (c) on Information (m) and Parity (p)]

| Number of Errors | | | Detection of Errors | |
|---|---|---|---|---|
| Location of Errors | | Check Character (c) | Errors Detected by— | |
| Information (m) | Parity (p) | | Parity (p) | Check Number |
| 0 | 0 | Any | — — | Yes |
| 2 | 0 | 0 | — — | Yes |
| 1 | 1 | 0 | — — | Yes |
| Even or No Errors | 1 | Indifferent | Yes | — — |
| Odd Errors | 0 | Indifferent | Yes | — — |

TABLE VII.—SPECIAL CASES

[Parity (p) on Information (m) Only; Check Character (c) on Information (m) and Parity (p)]

| Number of Errors | | | Detection of Errors | |
|---|---|---|---|---|
| Location of Errors | | Check Character (c) | Errors Detected by— | |
| Information (m) | Parity (p) | | Parity (p) | Check Number |
| (One Error Only) | | | | |
| 1 | 0 | 0 | Yes | Yes (Correction) |
| 0 | 1 | 0 | Yes | Yes (Correction) |
| 0 | 0 | 1 | — — | Yes (Correction) |
| (Two Errors Only) | | | | |
| 2 | 0 | 0 | — — | Yes |
| 1 | 1 | 0 | — — | Yes |
| 1 | 0 | 1 | Yes | Probable |
| 0 | 1 | 1 | Yes | Probable |
| 0 | 0 | 2 | — — | Yes |
| (Three Errors Only) | | | | |
| 3 | 0 | 0 | Yes | Probable |
| 2 | 1 | 0 | Yes | Probable |
| 2 | 0 | 1 | No | Probable |
| 1 | 1 | 1 | No | Probable |
| 1 | 0 | 2 | Yes | Probable |
| 0 | 1 | 2 | Yes | Probable |
| 0 | 0 | 3 | — — | Yes |

TABLE VIII.—GENERAL CASES

[Parity (p) on Check Character (c) Only; Check Character (c) on Information (m) Only]

| Number of Errors | | | Detection of Errors | |
|---|---|---|---|---|
| Location of Errors | | Check Character (c) | Errors Detected by— | |
| Information (m) | Parity (p) | | Parity (p) | Check Number |
| 0 | Indifferent | Any | — — | Yes |
| 2 | Indifferent | 0 | — — | Yes |
| 1 | 1 | 0 | Yes | Yes |
| Indifferent | 1 | 0 | Yes | — — |
| Indifferent | 0 | Odd | Yes | — — |
| Indifferent | 1 | Even or None | Yes | — — |

TABLE IX.—SPECIAL CASES

[Parity (p) on Check Character (c) Only; Check Character (c) on Information (m) Only]

| Number of Errors | | | Detection of Errors | |
|---|---|---|---|---|
| Location of Errors | | Check Character (c) | Errors Detected by— | |
| Information (m) | Parity (p) | | Parity (p) | Check Number |
| (One Error Only) | | | | |
| 1 | 0 | 0 | — — | Yes (Correction) |
| 0 | 1 | 0 | Yes | — — (Correction) |
| 0 | 0 | 1 | — — | Yes (Correction) |
| (Two Errors Only) | | | | |
| 2 | 0 | 0 | — — | Yes |
| 1 | 1 | 0 | Yes | Yes |
| 1 | 0 | 1 | Yes | Probable |
| 0 | 1 | 1 | No | Yes |
| 0 | 0 | 2 | No | Yes |
| (Three Errors Only) | | | | |
| 3 | 0 | 0 | — — | Probable |
| 2 | 1 | 0 | Yes | Yes |
| 2 | 0 | 1 | Yes | Probable |
| 1 | 1 | 1 | No | Probable |
| 1 | 0 | 2 | No | Probable |
| 0 | 1 | 2 | Yes | Yes |
| 0 | 0 | 3 | Yes | Yes |

Referring now to FIGURE 1, there is shown in block diagram form a circuit which may be used to carry out the method of the present invention. It should be understood that various devices may be used in carrying out the method and that the circuit shown is only one of several embodiments that may be used.

The apparatus shown is duplicated at the sending station and the receiving station and is capable of operating in two different modes. In the first mode, the apparatus generates a check character $c$, and a parity bit, $p$, from the information word, $m$, which are then both appended to the information word and transmitted to the receiving station. In the second mode of operation, the apparatus provides a comparison of the received check number with the corresponding check character $c'$ and the parity bit $p'$ which are generated from the received information word signals. If the check character $c$ and $c'$ are identical and the parity bits $p$ and $p'$ are identical, the incoming or received information is correct, and an indication is given that no error arose during the transmission.

The particular mode of operation is determined by the position of the multi-pole switch indicated generally by the numeral 10. The incoming message for which it is desired to generate a check number is applied in serial fashion to the local data input terminal 12 from some suitable source such as a keyboard or other digital input device. A conductor 14 connects the input terminal 12 to the switch arm 10a of the mode control switch 10. A conductor 16 connects the contact associated with the switch arm 10a to a junction point 18. At junction 18 the input data signals are permitted to follow two possible paths.

The first path which the input data signals follow is through the conductor 26 to a first input terminal 28 of a logical OR circuit 30. As is well known in the art, an OR circuit is a device having a plurality of inputs and a single output. A signal is produced at the output when one or more of the input terminals are receiving signals. Since many circuits are available for implementing OR logic, it is felt unnecessary to further describe a specific circuit for accomplishing the desired result.

The second possible path for the input data signals appearing at junction 18 is through the conductor 32 to one input terminal of an OR circuit 34. The output signals from OR circuit 34 are applied over a conductor 36 to a first terminal of an AND gate 38.

An AND circuit is a logical coincidence type circuit having a plurality of input terminals and a single output terminal. When signals are simultaneously applied to all the input terminals an output signal appears at the output terminal. However, if one or more of the input terminals does not receive an input signal, no output signal appears at the output terminal of the AND gate. Again, many circuits for implementing AND logic are known in the art and therefore a further discussion of a specific embodiment is felt to be unnecessary. The output terminal of AND gate 38 is connected by means of a conductor 40 to the input terminals 42 through 52 of the AND gates 54 through 64, respectively. A path is also provided from the output terminal of gate 38 through a conductor 20 to the center toggling terminal 22 of a bistable circuit or flip-flop 24. Flip-flop 24 is the means employed for generating the parity bit $p$.

The gates 54 through 64 have their other input terminals, 66 through 76 respectively, connected to the output of separate states of a binary counter 78. Counter 78 is comprised of $k$ bistable stages and it therefore has a modulus of $2^{k-1}$, i.e., it is able to represent $2^k-1$ distinct states before repeating.

A source of clock pulses (not shown) which is synchronized with the pulse repetition rate of the data word entering into the apparatus, is connected to the clock pulse terminal 80 and the pulses therefrom are applied to the input terminal 82 of an AND gate 84. When a signal is present on the other input terminal 86 of AND gate 84, these clock pulses appear on the output conductor 88 of the gate and are applied to the input terminal 90 of the Weight Counter 78. Since conductor 92 connects the "0" side of the Compare Flip-Flop 94 to the second input terminals of the AND gates 38 and 84, these gates are in an enabled condition when the flip-flop 94 is in its "0" state and are permitted to pass signals therethrough to conductors 40 and 88, respectively.

The output terminals of the AND gates 54 through 64 are connected to the input terminals 96 through 106 of an accumulator 108. An accumulator is a device which stores a number and which, on receipt of another number adds it to the number already stored and stores the sum. Accumulator 108 has $k+1$ binary states therein and is therefore able to store a character $2^k$ bits in length. When the sum contained in the accumulator exceeds the modulus $2^k$, this sum is effectively divided by the modulus, the quotient being discarded and the remainder being left in the accumulator as the check character. Each of the $k+1$ stages of the accumulator 108 is provided with an output conductor, here shown as conductor 110 through 122. These last mentioned conductors are respectively connected to a first input terminal of a series of AND circuits 124 through 136. The other input terminals of these last mentioned gates are connected by means of the conductors 138 through 150 to a suitable source of timing pulses (not shown). The source of the timing pulses may be any one of a number of well known devices, for example, a ring counter with an output taken from each stage, a pulse distributor, or a pulse commutator. Like the OR and AND logical circuits, various forms of timing chains are well known to those versed in the digital computing art and therefore, further discussion of specific circuitry is felt to be unnecessary.

The output terminals of the AND gates 124 through 136 are identified by the numerals 152 through 164 respectively, and are connected in common by means of a conductor 166 which, in turn, is connected through the mode control switch arm 10e and the conductor 168 to a second input terminal of the OR circuit 30. A conductor 170 connects the output of OR circuit 30 to the local output terminal 172.

The circuitry thus far discussed is sufficient to describe the operation when the system is operating in a sending mode. Before continuing with a description of the circuit layout for the receiving mode, a discussion of the operation of the apparatus in a sending mode will first be given.

Operation-Sending mode

In the sending mode, the mode selection switch 10 is operated so that the switch arms 10a and 10e are closed against their associated contacts while the switch arms 10b, 10c, and 10d remain open. Prior to receiving any information signals, all bistable circuits except the Parity Flip-Flop 24, i.e., the Compare Flip-Flop 94, the counter 78 and the accumulator 108 are reset to "0." The Parity Flip-Flop is initially set to its "1" state. The reset circuitry is not shown in order to avoid confusion in this drawing. The signals representing the information word, $m$, are impressed on the Local Data Input terminal 12 in serial order and are conveyed by means of the conductor 14, the closed switch 10a and the conductor 16 to the junction 18. At the same time, the clock pulse source connected to the terminal 80 provides timing pulses in synchronism with the rate at which data is being applied to the input terminal 12. In other words, the frequency of the clock pulse source connected to the terminal 80 is substantially the same as the bit repetition rate of the incoming message. The first clock pulse appears one digit period before the first signal digit of the information $m$ appears. Since the Compare Flip-Flop 94 is in its zero state a signal is applied via conductor 92 to the input terminal 86 of gate 84. As a result, the first clock pulse passes through the AND gate 84 and is effective to toggle the first stage of the Weight Counter 78 to its "1" state. It is obvious that each time a clock pulse passes through the gate 84 the counter is advanced by one to thereby increase the weight of each succeeding digit position of $m$ by one.

Each time a "1" digit signal of the message $m$ appears at the junction 18, it is conveyed through OR circuit 34, AND gate 38 and over conductor 20 to toggle the Parity Flip-Flop 24. Since, as mentioned previously, the Parity Flip-Flop was initially set to "1," if at the end of the message it is in its "1" state it is known that the number of binary "1" digit signals in the data word was even, and that it will be necessary to append a "1" signal to it in order that the number of "1" signals in the combination will be odd.

Each time a one digit signal in the data word $m$ appears at the junction 18 it passes over conductor 32, through OR circuit 34, through the now enabled AND gate 38 and along the conductor 40 so as to appear as an enabling signal on the conductors 42 through 52 connected to the AND gates 54 through 64. Each time a "1" digit signal is applied to these gates, therefore, the count contained in the Weight Counter 78 is transferred to the accumulator 108 and added to the contents already contained therein.

Table X below aids to illustrate the operation of the apparatus when functioning in its sending mode. In this example since there are 23 bits in the message, the sum of the largest two weights is $23+22=45$. Hence in accordance with what has already been said, an integer value of $k=6$ is required to make $2^k$ greater than this sum. Therefore, in order to implement the error checking method a five stage counter and a six stage accumulator are required.

TABLE X

| | Message | Weight Counter (Mod. $2^{k-1}$) | Accumulator (Mod. $2^k$) | Parity F.F. |
|---|---|---|---|---|
| LSD | 0 | 00001 | | 1 |
| | 1 | 00010 | 000010 | 0 |
| | 0 | 00011 | | 0 |
| | 1 | 00100 | 000110 | 1 |
| | 1 | 00101 | 001011 | 0 |
| | 1 | 00110 | 010001 | 1 |
| | 1 | 00111 | 011000 | 0 |
| | 0 | 01000 | | 0 |
| | 1 | 01001 | 100001 | 1 |
| | 1 | 01010 | 101011 | 0 |
| | 0 | 01011 | | 0 |
| | 0 | 01100 | | 0 |
| | 1 | 01101 | 111000 | 1 |
| | 1 | 01110 | 000110 | 0 |
| | 0 | 01111 | | 0 |
| | 1 | 10000 | 010110 | 1 |
| | 1 | 10001 | 100111 | 0 |
| | 0 | 10010 | | 0 |
| | 0 | 10011 | | 0 |
| | 1 | 10100 | 111011 | 1 |
| | 0 | 10101 | | 1 |
| | 0 | 10110 | | 1 |
| MSD | 1 | 10110 | 010001 | 0 |

In the left hand column is a typical binary coded message appearing in serial form with the least significant digit (LSD) appearing at the top and the most significant digit (MSD) at the bottom. As mentioned previously, the Weight Counter 78 is advanced to contain a "1" bit prior to the receipt of the first bit in the message. Also, the Parity Flip-Flop 24 is initially set to its "1" state. From Table X it can be seen that each time a "1" bit appears in the message $m$, the contents of the counter is transferred to the accumulator and added to value previously stored therein. Also, the Parity Flip-Flop is toggled to its opposite state to provide a modulo two count of the number of "1" bits in the message. After the most significant digit of the message has been processed, the contents remaining in the accumulator is the desired check character and the state of the Parity Flip-Flop indicates the bit which must be appended to the message $m$ to make the number of "1" bits in the combination odd.

At the same time that the parity count is being made and the counter and the accumulator are being advanced, the signals of the data word are being conveyed over the conductor 26 and through the OR circuit 30 and conductor 170 so as to appear at the local output terminal 172. The data appearing at the terminal 172 is then transmitted by any well known means for digital communication to a remote receiving station.

As the last bit of information is passed out of the local output terminal 172, and END OF INFORMATION signal, which may be generated by the device supplying the local data to input terminal 12, is applied to the END OF INFORMATION terminal 174 so as to set the Compare Flip-Flop 94 to its "1" state. With Flip-Flop 94 in its "1" state, a signal is no longer impressed by means of the conductor 92 to the AND circuits 38 and 84. As a result, neither further clock pulses nor further information signals are allowed to pass through the respective gates. At this point, the device (not shown) for generating the timing pulses is activated and the pulses therefrom are applied in succession and at the same bit repetition rate as the signals in the message $m$ to the terminals 137 through 150. The timing pulse applied to the terminal 137 causes the parity signal to be stepped out of the Flip-Flop 24 and it then follows the conductor 166 through the still closed switch arm 10e and through the OR circuit 30 and appears on the tail end of the message $m$ being sent out from the local output terminal 172. Similarly, the pulses from the timing chain when applied in sequential order to the terminals 150, 148, 146, etc. causes the contents of the accumulator to be stepped out in serial fashion along the conductor 166 and through the OR circuit 30 to the local output terminal where they are also appended to the parity checked message and form the check number.

It can be seen then that the apparatus thus far described is capable of accepting incoming messages, determining a proper parity digit, forming a unique check character therefore, and appending both the parity digit and the check character to the message before it is transmitted to the receiving station as a check number. Now that the operation of the circuit when in its sending mode has been described in detail, consideration will be given to the circuit layout of the additional equipment required when the apparatus is to operate in the other of its two modes, i.e., the mode of checking the received message.

Layout-Receive mode

When operating in its receiving or checking mode, the mode control switch 10 is reversed from the position shown such that switch arms 10a and 10e are no longer touching their associated contacts while switch arms 10b, 10c, and 10d close against their associated contacts.

With switch contact 10d in a closed position, the start terminal 176 is connected by means of the conductors 178 and 180 to the set input terminal of the Decode Check Flip-Flop 182. The "1" side of this flip-flop is connected by means of the conductor 184 to a first input terminal of an AND gate 186 so that when the flip-flop 182 is in its "1" state the gate 186 is in an enabled condition.

The received data signals $m$, the parity signal $p$, and the check character signals $c$ are applied to the remote data input terminal 188. Since the switch contact 10c is closed when the apparatus is in its receiving mode the input data signals appear at the junction 190 where they split so as to flow in two possible paths. The first path is along conductor 192 to a second input terminal of the AND circuit 186. The output from the AND gate 186 is tied into the OR circuit 34 previously described.

The second path for the flow of information signals from the junction 190 is along the conductor 194 to a first input terminal of an AND gate 196. The second input for gate 196 is taken from the "1" side of the Compare Flip-Flop 94 by means of the conductor 198. The conductor 200 connects the output from gate 196 to a first input terminal of an EXCLUSIVE OR circuit 202. An EXCLUSIVE OR circuit is one which provides an output when signals are applied to one or more of its input terminals, but not when signals are applied to all of its input terminals.

The output from the EXCLUSIVE OR circuit 202 provides an input to another AND gate 204. The "1" side of the Compare Flip-Flop 94 is also connected by means of a conductor 206 to a first input terminal of an AND gate 208. The other input for the gate 208 is connected by means of a conductor 210 to the clock pulse terminal 80. Therefore, when the Compare Flip-Flop is in its "1" state the gate 208 is enabled and clock pulses are permitted to pass therethrough to a second input terminal of the AND gate 204. When the apparatus is in its received mode, the switch contact 10b is closed so that the check number signals which are stepped out of the accumulator along the conductor 166 appears at the junction 212 and is conveyed through switch 10b and conductor 214 to a second input terminal of the EXCLUSIVE OR circuit 202.

Operation-Receiving mode

The operation of the apparatus in the second of its two modes is now explained. To allow the apparatus to operate in its second mode, the Mode Control Switch 10 is reversed such that contacts 10a and 10e are open while switches 10b, 10c, and 10d are closed. Prior to the receipt of the incoming message, all elements in the apparatus except the Parity Flip-Flop are reset to their "0" state as was done in the first operating mode.

The first signal of the incoming word termed the START SIGNAL, which is in the digit position immediately preceding the first digit of the message $m$ is applied to the terminal 176 and conveyed through conductors 178, the switch 10d, and the conductor 180 to set the Decode Check Flip-Flop 182 to its "1" state. The resulting output on the line 184 is applied to a first input terminal of the AND gate 186 and serves to enable this gate. Since the Compare Flip-Flop 94 is in its "0" state, a signal is applied by means of the conductor 92 to the first input terminals of the AND gates 38 and 84. Simultaneously, the first clock pulse from the source connected to the clock pulse terminal 80 passes through the enabled gate 84 and along the conductor 88 to advance the Weight Counter 78 from 000000 to 000001. As before, this gives the least significant digit of the message $m$ a weight of one.

The incoming message is applied to the remote data input terminal 188, and from there the signals representing said data pass through the now closed switch 10c to the junction 190. Since the Compare Flip-Flop 94 at this time is in its zero state, the incoming message is unable to pass through the AND gate 196. As mentioned previously, the Decode Check Flip-Flop 182 is in its "1" state so that the gate 186 is able to pass the incoming message signals from conductor 192 through the OR circuit 34 and through the enabled gate 38 so as to appear as probing pulses for the AND gates 54 through 64. As was discussed previously in connection with the sending mode of operation a "1" signal appearing on conductor 40 causes the contents of the Weight Counter 78 to be added to the contents of the accumulator 108. A "1" signal appearing at the output of the gate 38 is also applied to the center toggle terminal 22 of the Parity Flip-Flop 24 by way of conductor 20. Each time a "1" bit appears in the message $m$, the Parity Flip-Flop is center toggled to provide a modulo two count of the number of binary ones in the receiving message and additionally the contents of the counter 78 are added to the accumulator to cause a generation of the check character $c$, in the accumulator.

This process is repeated until the most significant digit of the message $m$ is processed at which time the END-OF-WORD signal appears at the terminal 174 and is effective to reset the Decode Check Flip-Flop 182 to its "0" state to disable the gate 186 and thereby prevent any successive bits (those of the check character $c$ and the parity digit $p$) from initiating a transfer of the information from the counter 78 to the accumulator 108. Because of the method employed for generating the check number it becomes quite simple to separate these signals from the message signals so that a comparison can be made. This same END-OF-WORD signal is also applied to the "1" side of the Compare Flip-Flop 94 so as to enable the AND circuit 196. The signals representing the parity digit $p$ and the check character $c$ are appended to the message $m$ and therefore come in on terminal 188 and pass along conductor 194 and appear as a second input to the gate 196. The gate 196 being enabled allows these last mentioned signals to pass out on conductor 200 to appear as first input on the EXCLUSIVE OR circuit 202. Thus it can be seen that the encoding process is duplicated and the arithmetic accumulator contains the check character $c'$ which is identical to the transmitted check character $c$ if the message $m$ was properly received. Furthermore, the Parity Flip-Flop contains the parity digit $p'$ which should be the same as the parity digit $p$ if the transmission was correct.

The comparison of $c$ with $c'$ and $p$ with $p'$ is achieved as follows: As mentioned previously, after the message $m$ signals have been received and processed the remaining incoming signals comprise the check character $c$ and the parity bit $p$ which are blocked from affecting the arithmetic accumulator by the now disabled gate 186. As each bit of the incoming check character and parity digit enters the checking apparatus at terminal 188, the timing chain is activated so that the corresponding bit positions of the accumulator and Parity Flip-Flop, respectively, are probed by the pulses therefrom. The data contained in the accumulator is therefore stepped out on the conductor 166 in the manner previously described and conveyed through the switch and conductor 214 so as to appear as an input to the EXCLUSIVE OR circuit 202. At this point it should be recalled that an EXCLUSIVE OR circuit provides an output signal only if the same signals are not simultaneously applied to its input terminals. Therefore, if the corresponding positions of the accumulator contain a binary indication identical to the incoming check character bit and parity bit, no output is provided by the circuit 202. The contents of the accumulator are compared on a bit by bit basis with the incoming data and if either $c$ is unequal to $c'$ or $p$ is unequal to $p'$ in any bit position the circuit 202 provides an output indicating an error. This error indication may be stored in a flip-flop 216 to provide a steady output error signal.

Figure 2:
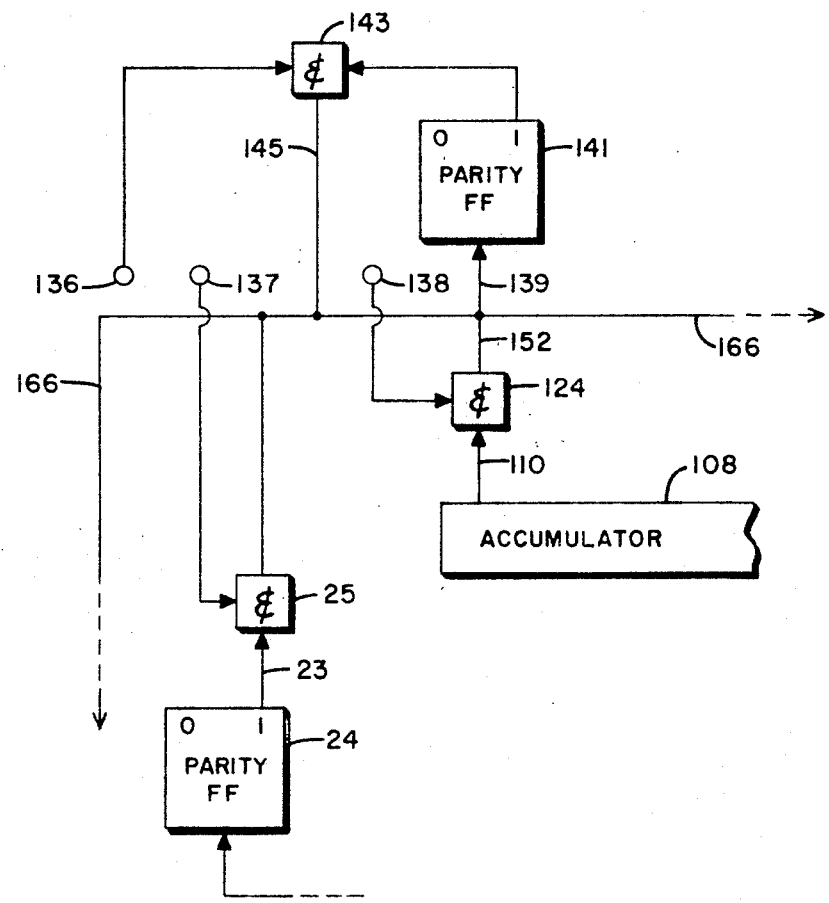
FIGURE 2 illustrates an alternative circuit arrangement of FIGURE 1 utilizing a second parity checking technique.

Although the apparatus illustrated in the drawing is arranged to obtain the format listed as Item 1 in Table I, it is obvious that only slight modifications to the circuitry illustrated need be made in order to transmit information in the other formats listed in Table I. For example, the format of Item 2 in Table I may be obtained by merely relocating the parity flip-flop 24 so as to be center toggled by the "1" bits in the data word $m$ as before, and then by the "1" bits of the check character, $c$, as the check character is being stepped out of the accumulator by the pulses from the timing chain. Also, it should be within the scope of ordinary skill in the art for one to modify the apparatus such that additional parity bits may be employed to hereby increase the error detecting capabilities of the apparatus as illustrated in FIGURE 2 wherein a second parity checking technique is utilized. Flip-flop 141 and AND gate 143 operate in the manner of parity flip-flop 24 and AND gate 25. By way of reference to FIGURE 2, it can be observed that the second parity circuitry means appends a parity bit to the check character being serially stepped out from the accumulator. Each time a "1" bit appears in the check character, the parity flip-flop 141 is center toggled to provide a module two count of the number of binary ones. A timing pulse applied to the terminal 136 causes the parity signal to be stepped out of the flip-flop 141 which then follows conductor 145 to the conductor 166, the second parity bit ($P_2$) being appended after the first parity bit as a result of the timing pulse application to the terminals 150–136 in successive order. From 166 the check character and the parity bits are transmitted to the receiving station where they are compared to a recomputed check character and parity bits. Also, it is felt that a mere change in the apparatus to allow for the handling of various message sizes is well within the realm of ordinary skill in the art.

While there has been shown and described and pointed out the fundamental novel features of the method of this invention as applied to a specific piece of equipment, it will be understood that various omissions and substitutions and changes in the form and details of the equipment illustrated may be made by those skilled in the art without departing from the spirit of the invention.

What is claimed is:

1. A method for determining the accuracy of transmission of data characters between two remote points wherein said characters are represented by a plurality of binary signals comprising the steps of:

developing at a first point in parity signal appending means a parity signal which when appended to the binary signals in a data word makes the number of binary "1" digits in the combination of the parity signal and the data word odd;

developing a weighted signal, in weighting means, for each of the binary signals in said combination by assigning successive numerical weights to each of said binary signals;

summing in accumulator means said weighted signals within a modulus not less than $2^k$, where $k$ is the smallest integer which makes $2^k$ greater than the sum of the largest two weights for the binary signals in said combination such that the weighted sums are effectively divided by said modulus;

discarding all but the signals forming the remainder of the effective division to form a check character;

transmitting said data word signals, said check character, and said parity signal to a second point;

recomputing at said second point from said parity signal and said data word signals a check character;

and comparing the last-mentioned check character with the corresponding check character developed at said first point for equality.

2. A method for determining the accuracy of transmission of data words between two remote points wherein said words are represented by a plurality of binary signals comprising the steps of:

developing at a first point in weighting means a weighted signal for each of the binary signals in a data word;

summing, in an accumulator means said weighted signals within a modulus not less than $2^k$, where $k$ is the smallest integer which makes $2^k$ greater than the sum of the largest two weights for said word, such that said weighted sums are effectively divided by said modulus;

discarding all but the signals forming the remainder of the effective division to form a check character;

deriving from a parity signal appending means a parity signal from said check character and word which, when combined with said data word and said check character, makes the number of binary "1" digits in the combination odd;

transmitting in a predetermined format said data word, said check character, and said parity signal to a second point;

recomputing at said second point from said data word a check character and a parity signal;

and simultaneously comparing the last-mentioned check character and parity signal with the corresponding check character and parity signal developed at said first point for equality.

3. A method for generating a unique check signal group for a larger group of binary signals for determining the accuracy of transmission of data characters between first and second remote points wherein said characters are represented by a plurality of binary signals comprising the steps of:

forming a first parity signal in signal forming means for a group of binary signals;

forming a weighted signal in weighting means for each of the binary signals in said group;

summing the weighted signals, in accumulator means, associated with the binary "1" signals in said group within a modulus not less than $2^k$, where $k$ is the smallest integer which makes $2^k$ greater than the sum of the largest two weights for the binary signals in said group to form a check character;

appending said first parity signal and said check character to said group of binary signals in a predetermined format by sequentially stepping out the check character from the accumulator means by the application of timing pulses to said accumulator means to gating means associated with said signal forming means;

forming a second parity signal in a second signal forming means which when appended to the check character makes the number of binary "1" digits odd;

appending said second parity signal to said check character, the first and second parity signals and said check character forming a check number;

transmitting in a predetermined format said group of binary signals and said check number to a second point;

computing at said second point a check number;

and comparing the last mentioned check number with the corresponding check number developed at said first point for equality.

References Cited

UNITED STATES PATENTS

Re. 24,447   3/1958   Bloch.
3,114,130   12/1963   Abramson _____ 340—146.1
3,036,771   5/1962   Fabiszewski _____ 235—153

OTHER REFERENCES

R. A. Davis: "Self-Checking Numbering System," IBM Technical Disclosure Bulletin, vol. 3, No. 3, August 1960, page 15.

MALCOLM A. MORRISON, Primary Examiner

R. S. DILDINE, JR., Assistant Examiner